United States Patent
Koets et al.

(10) Patent No.: US 10,387,085 B1
(45) Date of Patent: Aug. 20, 2019

(54) MODIFICATION OF ADVANCED FUNCTION PRESENTATION (AFP) PRINT JOBS

(71) Applicants: Gary Alan Koets, Longmont, CO (US); Michael Glen Lotz, Longmont, CO (US); David Lee Stokes, Longmont, CO (US); Adam Alvin Swartz, Boulder, CO (US)

(72) Inventors: Gary Alan Koets, Longmont, CO (US); Michael Glen Lotz, Longmont, CO (US); David Lee Stokes, Longmont, CO (US); Adam Alvin Swartz, Boulder, CO (US)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/909,147

(22) Filed: Mar. 1, 2018

(51) Int. Cl.
*G06F 3/12* (2006.01)

(52) U.S. Cl.
CPC .......... *G06F 3/1217* (2013.01); *G06F 3/1247* (2013.01); *G06F 3/1248* (2013.01); *G06F 3/1282* (2013.01); *G06F 3/1265* (2013.01)

(58) Field of Classification Search
CPC .... G06F 3/1208; G06F 3/1214; G06F 3/1217; G06F 3/1247; G06F 3/1248; G06F 3/1282; G06F 3/1265
USPC ......................................... 358/1.1–1.18, 402
See application file for complete search history.

(56) References Cited

U.S. PATENT DOCUMENTS

| | | | |
|---|---|---|---|
| 5,768,488 A | 6/1998 | Stone et al. | |
| 6,476,930 B1 | 11/2002 | Roberts et al. | |
| 7,546,056 B2 | 6/2009 | Konno | |
| 7,871,145 B1 | 1/2011 | Enge | |
| 8,248,652 B2 | 8/2012 | Wardell et al. | |
| 8,384,946 B2 | 2/2013 | Yamamoto et al. | |
| 8,472,830 B2 | 6/2013 | Fukasawa | |
| 8,724,140 B2 | 5/2014 | Tolomei et al. | |
| 9,218,327 B2 | 12/2015 | Belfiore et al. | |
| 9,298,404 B2 | 3/2016 | Niblett | |
| 9,489,152 B2 * | 11/2016 | Hohensee | G06F 3/12 |
| 2005/0055476 A1 * | 3/2005 | Aschenbrenner | G06F 3/1205 710/15 |
| 2008/0037047 A1 * | 2/2008 | Condon | G06F 17/211 358/1.13 |
| 2008/0144066 A1 | 6/2008 | Ferlitsch | |
| 2010/0318901 A1 * | 12/2010 | Eiler | G06F 17/211 715/248 |

(Continued)

*Primary Examiner* — Gabriel I Garcia
(74) *Attorney, Agent, or Firm* — Duft & Bornsen, PC (57) ABSTRACT

Combining multiple pages of an AFP print job into a single AFP output page that can be more efficiently printed is described. A print job is received, where pages in the print job begin with a first electronic marker indicative of a beginning of the page and ends with a second electronic marker indicative of an end of the page. A first page and a second page in the print job are identified to combine together into an output page, and an amount of offset for page contents of the second page is determined. The page contents of the second page are shifted by the amount of the offset. The first electronic marker is removed from the first page, the second electronic marker is removed from the second page, and page contents of the first page and shifted page contents of the second page are combined together into the output page. The output page is transmitted to a printer for printing.

30 Claims, 10 Drawing Sheets

(56) References Cited

U.S. PATENT DOCUMENTS

2012/0013922 A1* 1/2012 Lotz .................... G06F 3/1208
358/1.9

* cited by examiner

MODIFICATION OF ADVANCED FUNCTION PRESENTATION (AFP) PRINT JOBS

FIELD

This disclosure relates to the field of printing systems and, in particular, to modifying pages in AFP print jobs prior to printing to improve printing efficiency.

BACKGROUND

In large enterprise document printing/presentation environments, various final form presentation datastream standards are used to provide for standardized, complete definition of the final form for printing or other presentation of a document file. As used herein, "final form" refers to the complete definition in the presentation document of all information to define the content of the document and the formatting for presentation to a user (e.g., printed, displayed, etc.). Some final form standards are referred to as a "datastream" in that they comprise a continuous stream of data defining a sequence of data representing a sequence of one or more sheet sides in a sequence of one or more documents.

The Advanced Function Presentation ("AFP") architecture, such as that specified by IBM and entitled "Mixed Object Document Content Architecture" ("MO:DCA"—IBM document SC31-6802 which is hereby incorporated by reference), is exemplary of a final form presentation datastream and is often applied to high volume transaction processing printing and presentation environments.

The AFP architecture is a broad specification applicable across an industry of transaction print processing/presentation applications and enterprises. The AFP architecture family of specifications generally specifies the format of files for presentation information including the information to be presented as well as commands and directives (e.g., AFP structured fields) that define intended manner of presentation for the information content within the AFP file. In general, information in an AFP file is referred to as "components" and the file itself may often be referred to as a "document". In AFP terminology, a "printfile" may contain one or more documents. For purposes of this presentation, the distinction is not important and thus "printfile" and "document" may be used interchangeably.

Because MO:DCA is a low level datastream that is considered "final form", MO:DCA was not designed to be manipulated after composition to support changes that may improve the efficiency during printing. Rather, the intent of the MO:DCA design was to provide control over how pages are placed on physical media at print time. However, there are some cases where printing AFP print jobs could be improved. For instance, some high-speed production printers have limitations in the minimum form height for AFP print jobs that can be submitted to the printer. Thus, when some AFP print jobs are submitted for printing, some jobs (e.g., jobs that specify three-inch-high pages) cannot be printed on printers that require a minimum form height of five inches.

Thus, it is desirable to make changes to AFP print jobs prior to printing in order to provide more flexibility and efficiency to the printing process.

SUMMARY

Embodiments described herein provide for combining multiple pages of an AFP print job into a single AFP output page that can be printed more efficiently. Multiple pages in an AFP print job can be combined together in various layouts, including vertically stitching the pages together and/or horizontally stitching the pages together as desired.

One embodiment comprises an apparatus that includes an interface and a controller. The interface receives an AFP print job, where pages in the AFP print job begin with a first electronic marker indicative of a beginning of the page, and end with a second electronic marker indicative of an end of the page. The controller identifies a first page and a second page in the AFP print job to combine together into an AFP output page, determines an amount of offset for page contents of the second page, and shifts the page contents of the second page by the amount of offset. The controller removes the first electronic marker from the first page, removes the second electronic marker from the second page, and combines page contents of the first page and shifted page contents of the second page into the AFP output page. The controller then transmits the AFP output page to a printer for printing.

Another embodiment comprises a method of combining pages of an AFP print job. The method comprises receiving an AFP print job, where pages in the AFP print job begin with a first electronic marker indicative of a beginning of the page, and end with a second electronic marker indicative of an end of the page. The method further comprises identifying a first page and a second page in the AFP print job to combine together into an AFP output page, determining an amount of offset for the page contents for the second page, and shifting the page contents of the second page by the amount of offset. The method further comprises removing the first electronic marker from the first page, removing the second electronic marker from the second page, and combining page contents of the first page and the shifted page contents of the second page into the AFP output page. The method further comprises transmitting the AFP output page to a printer for printing.

Another embodiment comprises a computer-readable medium that includes programmed instructions which, when executed by a processor, direct the processor to receive an AFP print job, where pages in the AFP print job begin with a first electronic marker indicative of a beginning of the page, and end with a second electronic marker indicative of an end of the page. The instructions further direct the processor to identify a first page and a second page in the AFP print job to combine together into an AFP output page, to determine an amount of offset for the page contents for the second page, and instructions that direct the processor to shift the page contents of the second page by the amount of offset. The instructions further direct the processor to remove the first electronic marker from the first page, to remove second electronic marker from the second page, and to combine page contents of the first page and the shifted page contents of the second page into the AFP output page. The instructions further direct the processor to transmit the AFP output page to a printer for printing.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
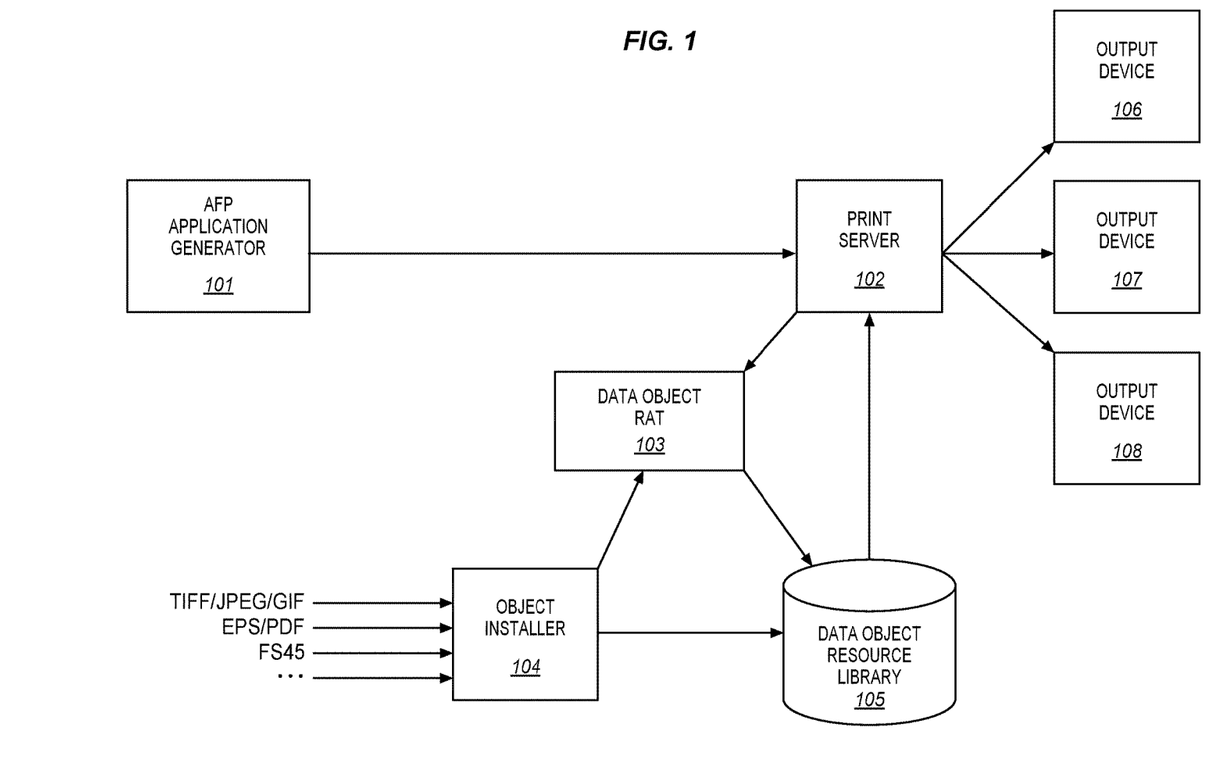
FIG. 1 is a block diagram of an AFP environment in an illustrative embodiment.

FIG. 1 is a block diagram of an AFP environment in an illustrative embodiment. The AFP environment of FIG. 1 involves use of a print server 102, for example, which receives a document, processes it, and forwards it as a data-stream to an end point presentation device such as a printer, print engine, display, or the like. Typically, print server 102 includes associated storage capability, such as disk files, in which program modules such as instructions and profiles can be accessibly stored for execution on a processor of print server 102 as desired.

In the AFP architecture, a Mixed Object Document Content Architecture (MO:DCA) document is provided to print server 102. Print server 102 then generates an Intelligent Printer Data Stream ("IPDS") command stream for sending to a printer or other output device for the purpose of outputting (e.g., presenting) the document. In its most complex form, an MO:DCA document contains data objects along with data structures which define the document's layout and composition features. This form is called an MO:DCA presentation document. In the embodiments described herein, pages in MO:DCA documents can be combined together in various ways to improve the efficiency of the printing process. For instance, pages can be vertically stitched together into a new page, which may enable more efficient printing on some printers that have form height limitations.

In FIG. 1, an AFP application generator 101 sends a MO:DCA document to print server 102 for outputting. Note that for the purposes of this description it is assumed that the MO:DCA document may include a reference to an object external to the document which is accessible to print server 102 to effectuate presentation or other processing of the document. The object could, for example, be a TIFF/JPEG/GIF object, an EPS/PDF object, an FS45 object, objects related to meta-data (including, for example, MDOs, XML information (including XML Document Type Definitions—"DTDs", JDF information, digital signature information, etc.), or other objects of a defined format in accordance with AFP standards. Such objects are installed via an Object Installer 104, which stores objects in an object resource library 105. Additional details regarding the object, such as where it is installed, is entered as an entry of a Resource Access Table (RAT) 103. RAT 103 is effectively an index which print server 102 may use to locate the object in storage.

When print server 102 receives the MO:DCA document from AFP application generator 101, it processes the document by converting it to an IPDS command stream for forwarding to an output device. As part of this process, print server 102 may obtain the name from the object reference included in the document and may use the name to locate the entry in RAT 103 for the object. Using the entry in RAT 103, print server 102 obtains the object from object resource library 105 and imbeds it into the IPDS command stream. The completed IPDS command stream is then forwarded by print server 102 to an appropriate output device (e.g., 106, 107, and 108). Output device 106-108 could be, for example, a printer.

The components of an MO:DCA document are defined by the AFP standards with a syntax which consists of self-describing structures. Structured fields are the main MO:DCA structures and these are used to encode MO:DCA commands. A structured field starts with an introducer which uniquely identifies the command, provides a total length for the command, and specifies additional control information such as whether padding bytes are present. The introducer is followed by up to 32,759 data bytes. Data may be encoded using fixed parameters, repeating groups, keywords, and triplets. Fixed parameters have a meaning only in the context of the structure that includes them. Repeating groups are used to specify a grouping of parameters which can appear multiple times. Keywords are self-identifying parameters which consist of a one-byte unique keyword identifier followed by a one-byte keyword value. Triplets are self-identifying parameters which contain a one-byte length, a one-byte unique triplet identifier, and up to 252 data bytes. Keywords and triplets have the same semantics wherever they are used. Together, these structures define a syntax for MO:DCA documents which provides for orderly parsing and flexible extensibility.

A MO:DCA printfile is defined in a hierarchy of components and the printfile component is the highest level of the hierarchy. Documents are at the next level and can be made up of pages, and page components are at the intermediate level of the hierarchy. Further, pages can be made up of objects and objects components are at the lowest level of the hierarchy. Further, groups of pages may exist within a print-file, and define individual mail pieces, customer statements, or other indivisible groups of pages subject to presentation or regulatory requirements. Object components can, for example, be bar codes, graphics, images, and presentation text. Multiple documents can be grouped together into a print-file.

At each level of the hierarchy certain sets of MO:DCA structured fields are permissible. The document, pages and objects are bounded by a pair of structured fields, known as begin-end pairs, which define a presentation wrapper for the data-stream components.

Figure 2:
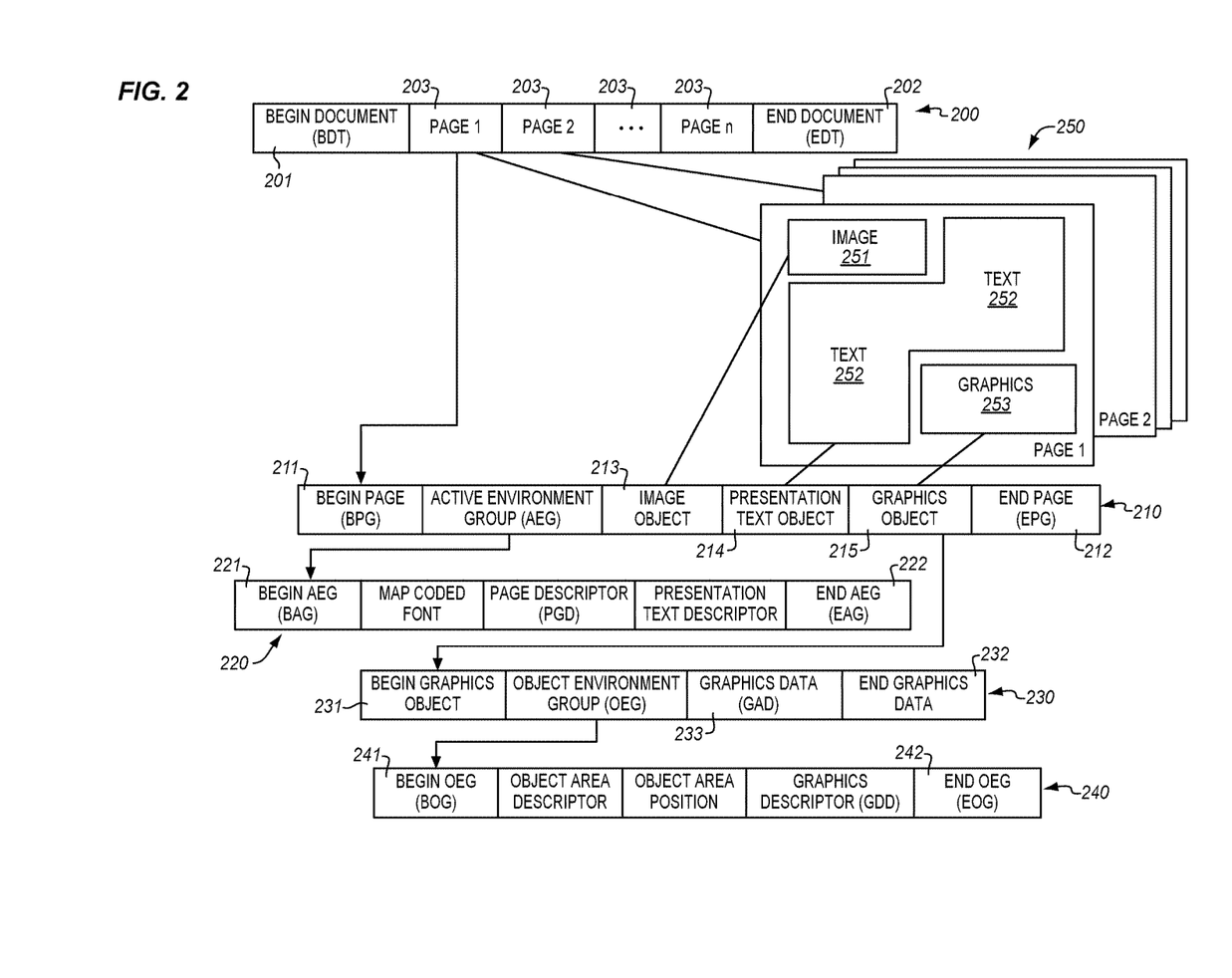
FIG. 2 is a diagram which illustrates the main components of a MO:DCA document which defines a document for printing in an illustrative embodiment.

FIG. 2 is a diagram which illustrates the main components of a MO:DCA document which defines a document 250 for printing in an illustrative embodiment. Document 250 comprises several pages, and the content of page 1 is illustrated. Page 1 contains an image object 251, a section of text 252, and a graphics object 253 such as a bar chart.

The highest level component of the MO:DCA document of FIG. 2 is the document component which is defined by a begin-end pair comprising a "Begin Document" (BDT) structured field 201 and ends with an "End Document" (EDT) structured field 202. Each page within the document is independent from any other page and the BDT structured field is followed by separate details 203 of each page to be printed. Each of these separate details 203 comprise a page component 210 which is defined by a begin-end pair comprising a "Begin Page" (BPG) structured field 211 and an "End Page" (EPG) structured field 212. BPG structured field 211 is followed by an Active Environment Group (AEG) 220 which defines resource and layout information for the page such as measurement units, page width, and page depth. Page component 210 also includes details of each of the objects which make up the page. These details comprise image object details 213, presentation text object details 214, and graphics object details 215. For example, the Graphics objects details are contained in a graphic object component 230 which is defined by a begin-end pair comprising a "Begin Graphics Object" (BGR) structured field 231 and an "End Graphics Object" (EGR) structured field 232. The BGR structured field is followed by an Object Environment Group (OEG) 240 and graphics object data 233. OEG 240 defines resource and layout information for the graphics object such as placement and orientation of the graphics object on the page. Note that, although not shown in FIG. 2, image object details 213 and presentation text object details 214 will comprise an image object component and a presentation text component, respectively, which are similar to the graphics object component 230 but with appropriate begin-end pairs. Similarly, although not shown in FIG. 2, "Begin Named Group" (BNG) and "End Named Group" (ENG) structures can create groups of pages.

Note that alternatively to including the actual data object in the MO:DCA document as shown in FIG. 2 for graphics object data 233, a reference to the data object can be included. For example, the reference to the data object can be contained in a resource object component instead of a data object component, such a resource object component being defined by a begin-end pair comprising a Begin Resource (BRS) structured field and an End Resource (ERS) structured field. Further such a resource object can include reference to a secondary resource object.

Also, not all possible components of an MO:DCA document have been described with reference to FIG. 2. For example, the document can include overlay components which are page-like components which define their own environment parameters.

Figure 3:
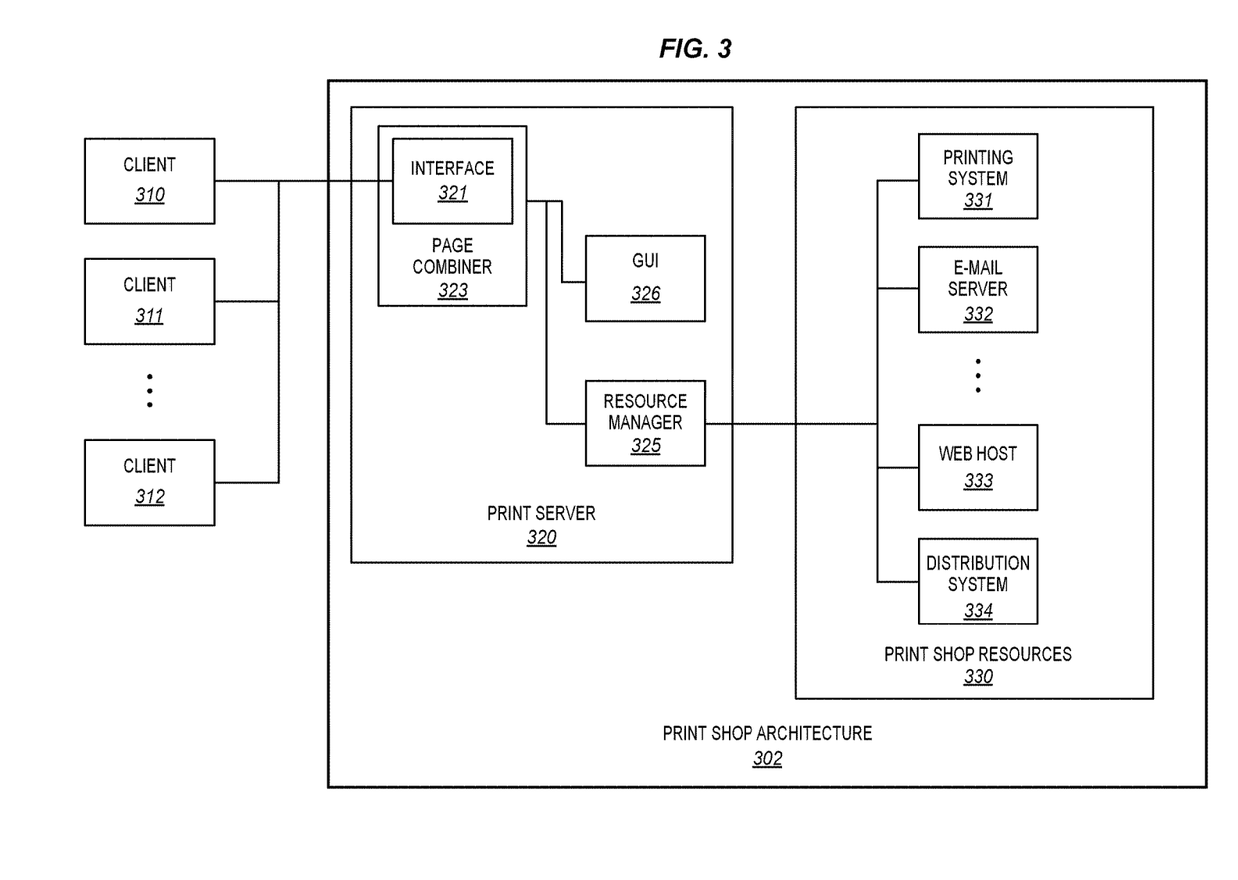
FIG. 3 is a block diagram illustrating a print shop architecture in an illustrative embodiment.

FIG. 3 is a block diagram illustrating a print shop architecture 302 in an illustrative embodiment. Print shop architecture 302 includes a print server 320, which functionally connects one or more clients 310-312 to print shop resources 330. Clients 310-312 may be servers or software applications (e.g., AFP applications) used by print shop customers. Clients 310-312 submit print data and job tickets that describe how the print data will be processed to interface 321. Print server 320 combines and/or stitches together pages of incoming print jobs, generates print workflows for incoming print jobs, and manages print shop resources 330 in accordance with these print workflows.

Clients 310-312 may serve banks, credit card companies, or other customers that have printing and document delivery needs (e.g., monthly bank statements, monthly credit card bills, etc.). In some cases, print jobs are received by print shop architecture 302 that could be printed more efficiently if modified. For instance, a page combiner 323 of print server 320 may be utilized to vertically and/or horizontally stitch pages of an AFP print job together to overcome limitations of printers that are available at print shop architecture 302. Stitching pages together may enable more efficient printing in cases whereby some printers are limited to only accept pages that meet a minimum form height.

Clients 310-312 may also serve customers with digital printing and publishing needs (e.g., needs for e-mail services, web publishing services, and others). Information describing the activities requested by the customer may be included in job tickets sent by clients 310-312.

Print shop resources 330 include the devices and components of the print shop that are used to perform print shop activities. For example, print shop resources 330 may include personnel, printers, post-printing machinery, e-mail or web publishing servers, media, ink, firmware versions for print shop devices, etc. Print shop resources 330 may exist within the confines of the print shop itself, or may comprise off-site devices and functional components managed by print server 320. The print shop resources 331-334 illustrated in FIG. 3 are merely meant to provide an example of the variety of print shop resources 330 that may be provided. For instance, print shop resources 330 may include printing system 3131 for transforming print data onto a suitable printable medium, such as paper. Other resources may include e-mail server 332 for generating e-mails, web host 333 for generating and hosting web pages or other internet content, and distribution system 334 for packaging and shipping printed documents.

While in operation, print server 320 identifies the available activities that may be performed by print shop resources 330. Print server 320 may determine the available print shop activities based upon the nature of print shop resources 330. For example, when print shop resources 330 include e-mail server 332, then the available activities may include generating e-mails, scheduling times to send e-mails, and selecting e-mail recipients. The activities may be associated with a category or type of resource (e.g., personnel, printers, servers) and may also be associated with specific named print shop resources (e.g., Susan, printing system 331, e-mail server 332).

Innumerable print shop activities may be available, and certain print shop activities may be logically related with each other so that they have order and dependency relationships (e.g., a post-printing activity such as hole punching depends upon the print data being successfully printed). A print shop operator may prioritize activities (e.g., to ensure that billing is the last activity performed), and may make certain activities required (e.g., billing may be required for every print job that enters the print shop). Furthermore, certain activities may be required, altered, or made optional based upon specific clients, customers, or information in a job ticket of the print job (e.g., customer service requests, multimedia parameters, size of the print data, format of the print data, print media selected by the customer for the print job, etc.). For example, "thank you" letters may be sent to high value or long-term customers, while credit checks may be performed upon new customers. In order to aid an operator of the print shop in creating a print workflow for a print job, a Graphical User Interface (GUI) 326 is provided for manipulation of print workflows.

Once the activities that are available at print shop architecture 302 have been determined, a print shop operator utilizes print server 320 to generate a print workflow for a print job. Once the print shop operator is satisfied with the print workflow, the print workflow is assigned to the new print job and submitted to a resource manager 125.

Resource manager 325 of print server 320 analyzes the print workflow assigned to the print job by the print shop operator, and directs print shop resources 330 to perform the activities defined by the print workflow for the print job. Resource manager 325 identifies activities that relate to specific print shop resources 331-334 (e.g., the activity "e-mail the client a printing status report" may relate to e-mail server 332), and instructs the specific resources to perform the identified activities. Resource manager 325 may also receive feedback from print shop resources 330 (e.g., information indicating that an activity has successfully completed).

Figure 4:
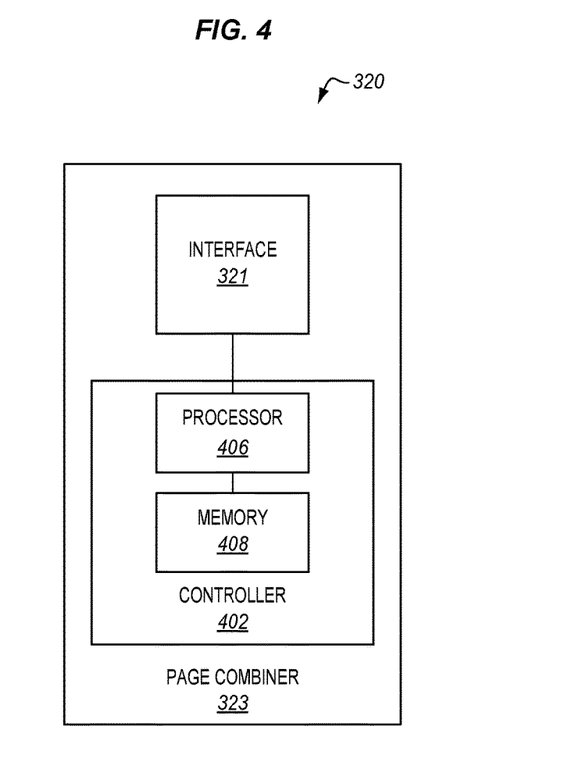
FIG. 4 is a block diagram illustrating additional details for an element of FIG. 3 in an illustrative embodiment.

FIG. 4 is a block diagram illustrating additional details for page combiner 323 of FIG. 3 in an illustrative embodiment. In this embodiment, page combiner 323 includes a controller 402 and interface 321. Controller 402 and interface 321 include any physical components, and/or physical systems, and/or physical devices that are capable of implementing the functionality described herein for page combiner 323. While the specific physical implementation of controller 402 is subject to design choices, one particular embodiment may include one or more processors 406 coupled with a memory 408. Processor 406 includes any electronic circuits and/or optical circuits that are able to perform functions. The term "circuits" used herein refers to a physical implementation of hardware that is capable of performing the described functionality. Processor 406 may include one or more Central Processing Units (CPU), microprocessors, Digital Signal Processors (DSPs), Application-specific Integrated Circuits (ASICs), Programmable Logic Devices (PLDs), Field-Programmable Gate Arrays (FPGA), etc. Some examples of processors include INTEL® CORE™ processors, Advanced Risk Machines (ARM®) processors, etc.

Memory 408 includes any electronic circuits and/or optical circuits and/or magnetic circuits that are able to store data. For instance, memory 408 may store information regarding pages of an AFP print job that will be combined, which may then be used by processor 406 to stitch the pages together. Memory 408 may include one or more volatile or non-volatile Dynamic Random-Access Memory (DRAM) devices, FLASH devices, volatile or non-volatile Static RAM devices, hard drives, Solid State Disks (SSDs), shift registers, etc. Some examples of non-volatile DRAM and SRAM include battery-backed DRAM and battery-backed SRAM.

In this embodiment, consider that client 310 generates an AFP print job for print shop architecture 302, and transmits the AFP print job to interface 321 of print server 320. Utilizing page combiner 323 and GUI 326, a print shop operator interacts with print server 320 to combine pages of the AFP print job together.

Figure 5:
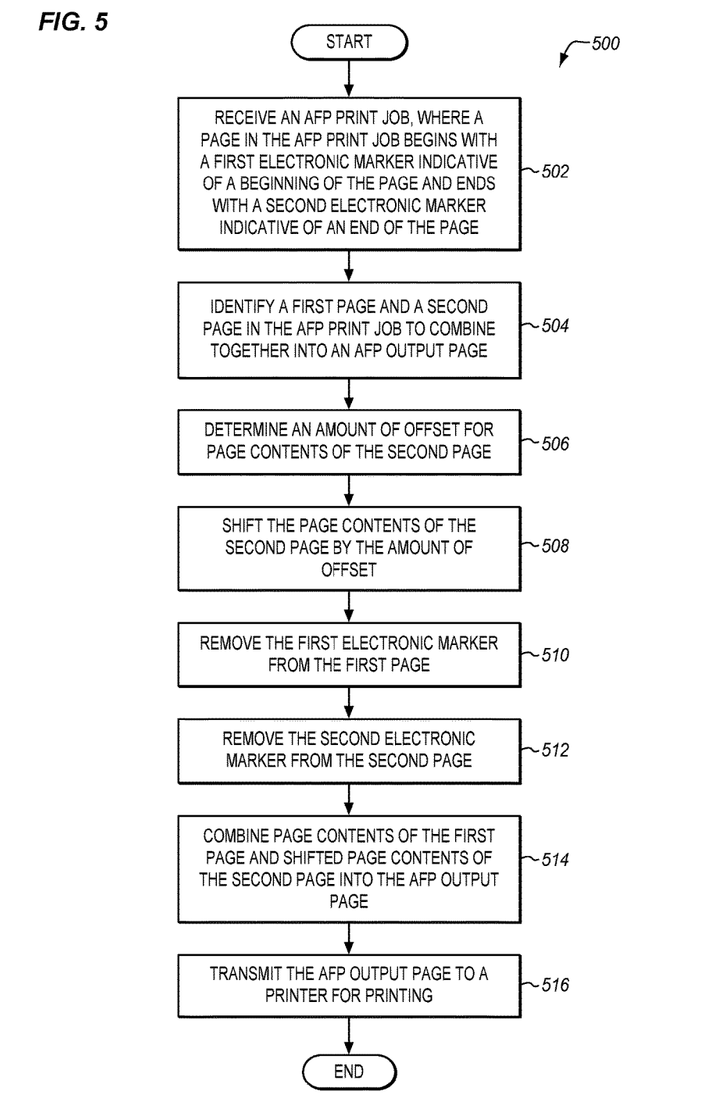
FIG. 5 is a flow chart illustrating a method of combining pages of an AFP document in an illustrative embodiment.

FIG. 5 is a flow chart illustrating a method 500 of combining pages of an AFP document together in an illustrative embodiment. The steps of method 500 will be described with respect to controller 402 of FIG. 4, although one skilled in the art will understand that method 500 may be performed by other systems not shown. The steps of the method described herein are not all inclusive and may include other steps not shown. The steps may also be performed in an alternative order.

Figure 6:
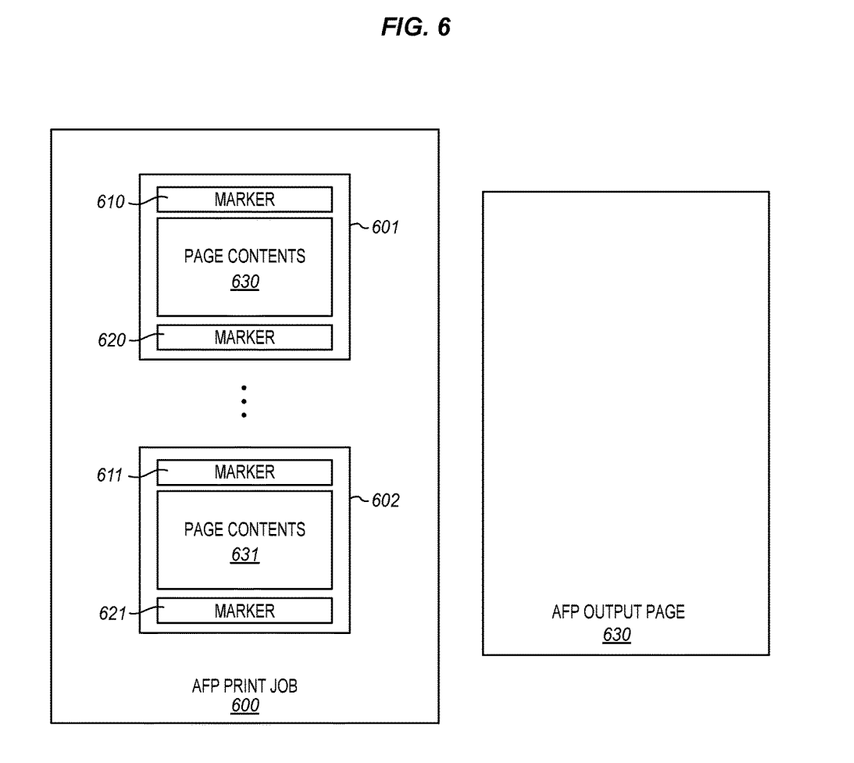
FIG. 6 illustrates an AFP print job that includes multiple pages in an illustrative embodiment.

To begin a process of combining pages in an AFP print job (e.g., combining a first page and a second page of the AFP print job together), interface 321 receives an AFP print job (see step 502). In particular, the AFP print job includes multiple pages which may be combined together in various ways to generate an AFP output page. FIG. 6 illustrates an AFP print job 600 that includes multiple pages 601-603 in an illustrative embodiment. In particular, pages 601-602 include electronic markers 610-611 indicative of a beginning of a page (e.g., a BPG structured field), electronic markers 620-621 indicative of an end of the page (e.g., an EPG structured field), and page contents 630-631, respectively. Although only two pages are illustrated in FIG. 6, AFP print job 600 may include any number of pages as desired. In response to interface 321 receiving AFP print job 600, controller 402 identifies pages 601-602 to combine together into an AFP output page 640. For example, pages 601-602 may each specify a page height which is less than the minimum form height of printing system 331. In order to efficiently print AFP print job 600 on printing system 331, AFP print job 600 is processed by page combiner 323 to vertically stitch pages 601-602 together onto a single page, thereby providing a page that is of sufficient height to enable printing system 331 to print AFP print job 600. While the following discussion will describe vertically stitching pages 601-602 together, pages 601-602 may also be horizontally stitched together in cases where it is desirable to increase a width of the page content for AFP output page 640. Further, both vertical and horizontal page stitching may be performed to generate an infinite number of possible new layouts for the pages of an AFP print job, such as AFP print job 600.

Figure 7:
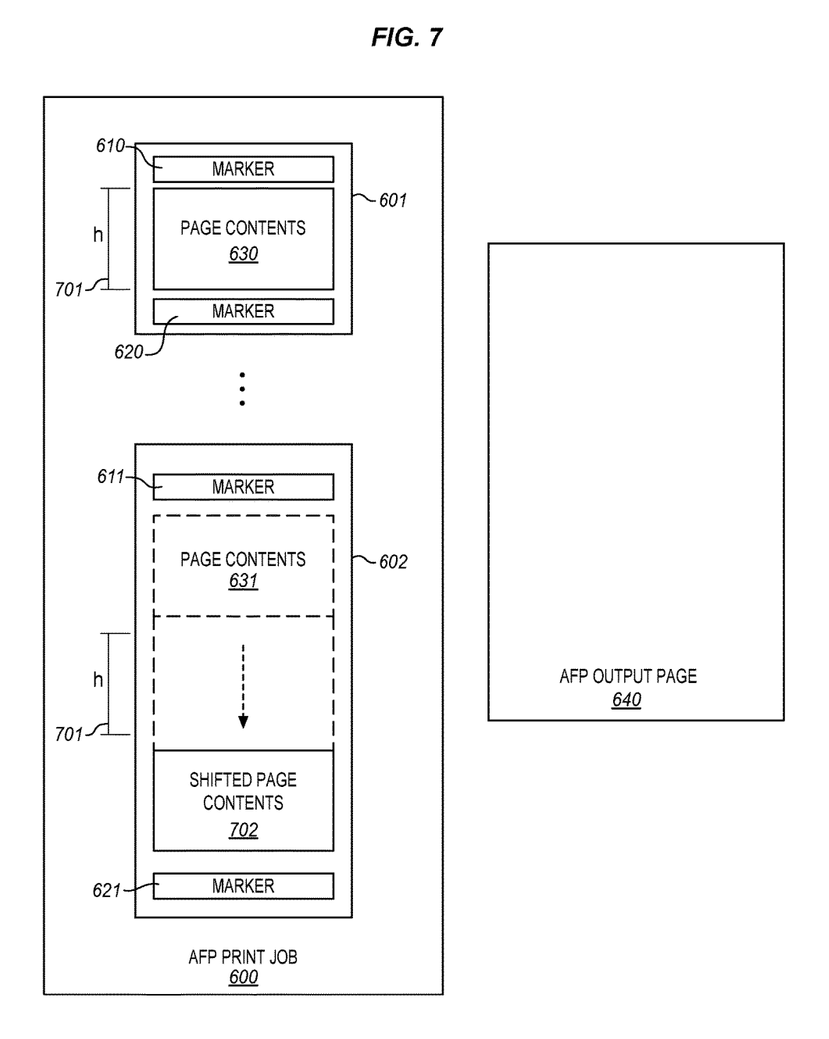
FIG. 7 illustrates the contents of a page of the AFP print job of FIG. 6 that have been shifted in an illustrative embodiment.

In order to stitch pages 601-602 together, page contents 631 of page 602 is offset with respect to the page origin of AFP output page 640. In particular, page contents 630 of page 601 will be place at the origin of AFP output page 640, and page contents 631 of page 602 will be shifted by some amount of offset that is determined (see step 504). For instance, the print shop operator may specify the amount of offset between pages 601-602 or controller 402 may determine the amount of offset based on the page dimensions (e.g., the height and/or the width) of page 601. Controller 402 shifts page contents 631 of page 602 by the amount of offset (see step 508). FIG. 7 illustrates page contents 631 shifted by an amount of offset 701 in an illustrative embodiment. In this embodiment, page contents 631 are shifted by an amount of offset 701 that corresponds to the height of page 601 due to vertically stitching pages 601-602 together. However, amount of offset 701 may correspond to the width of page 601 if pages 601-602 are horizontally stitched together.

The manner in which contents 631 are shifted may depend upon the type of content represented by page 602. For instance, if page contents 631 comprises included objects, then controller 402 may modify Include Page Overlay (IPO) structured fields and Include Page Offset (IPS) structured fields in page 602 to shift the included objects by amount of offset 701. An IPO structured field references an overlay resource definition that is positioned on a page. An IPS structured field references a page segment resource object that is positioned on a page. The IPS specifies a reference point on the including page or overlay coordinate system that may be used to position objects contained in the page segment.

In another example, page contents 631 may comprise objects, and controller 402 may modify Object Area Position (OBP) structured fields for the objects to shift the objects by the amount of offset 701. An OBP structured field specifies the origin and orientation of an area of an object.

In another example, page contents 631 may comprise text, and controller 402 may modify Absolute Move Inline (AMI) structured fields and Absolute Move Baseline (AMB) structured fields for the text to shift the text by the amount of offset 701. Both of the AMI and AMB structured fields control the placement of text on a page relative to the origin of the page.

Figure 8:
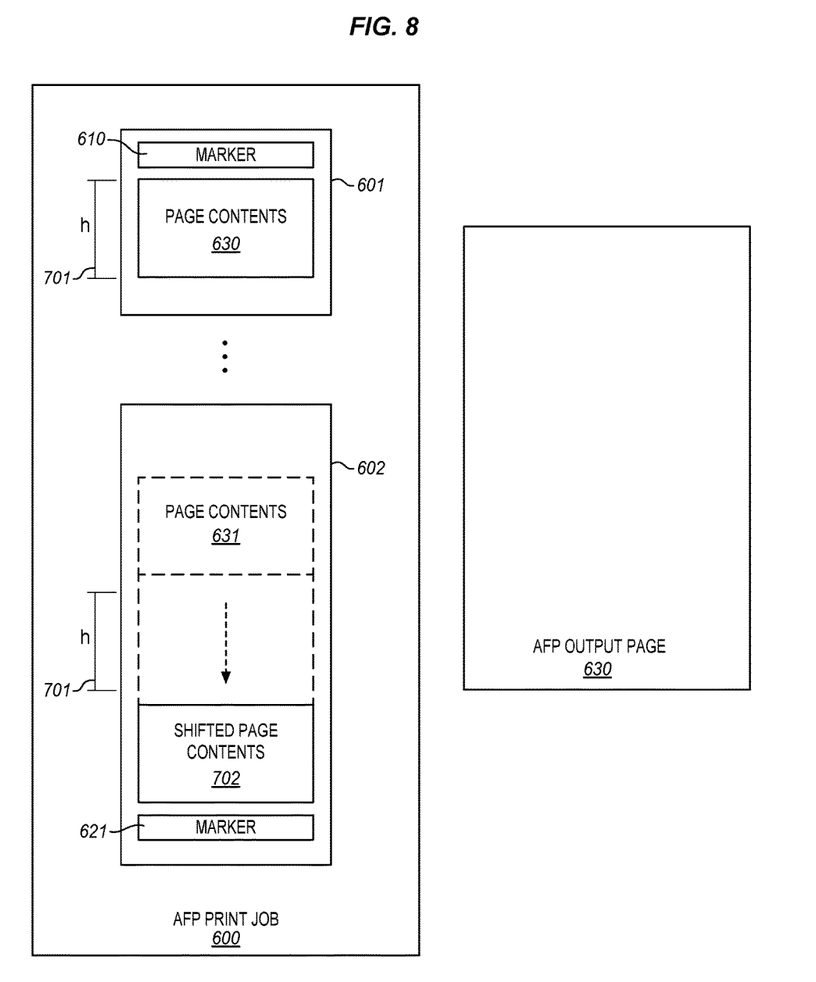
FIGS. 8-9 illustrates the results of performing steps of the method of FIG. 5 in illustrative embodiments.
Figure 9:
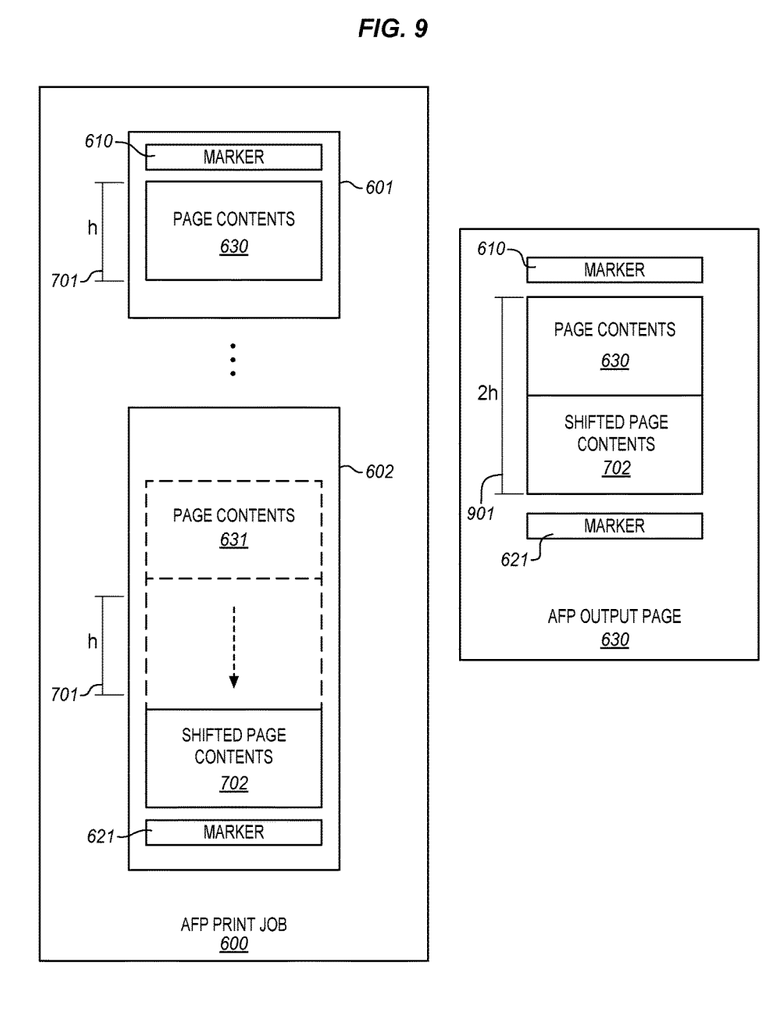

To begin a process of combining pages 601-602 together, controller 402 removes marker 620 from page 601 and removes marker 611 from page 602 (see steps 510-512). FIG. 8 illustrates the result of performing steps 510-512 in an illustrative embodiment. Marker 620 is removed from page 601, and marker 611 is removed from page 602. Controller combines page contents 630 of page 601 and shifted page contents 702 from page 602 onto AFP output page 640 (see step 514). FIG. 9 illustrates the result of performing step 514 in an illustrative embodiment. AFP output page 640 includes page contents 630 from page 601, and shifted page contents 702 from page 602. The page height 901 of AFP output page 640 in this embodiment is 2 h, or twice the page height of page 601. This process may be repeated as desired for AFP print job 600 by controller 402, which may then vertically and/or horizontally stitch together pages in AFP print job 600 together to generate any type of vertical and/or horizontally stitched output pages as desired. The pages generated by this process is/are sent to a printer for printing. For instance, controller 402 may transmit AFP output page 640 to printing system 331, which converts the AFP output page(s) 630 to a printable medium, such as paper. This allows print shop architecture 302 to modify received AFP jobs to enable AFP jobs to be printed more efficiently.

The AFP architecture defines Map structured fields for objects that are to be processed as resource objects. Some examples include the Map Page Overlay (MPO) structured field, the Map Page Segment (MPS) structured field, the Map Coded Font (MCF) structured field, and the Map Data Resource (MDR) structured field. Map structured fields are specified in environment groups and indicate to the presentation server that the referenced object is to be processed as a resource object and will be required for presentation. They may also provide additional information, such as a mapping of the resource reference to a local identifier for the resource. The scope of the environment determines the scope of the mapping. For example, if a resource is mapped in the Active Environment Group (AEG) structured field for a page, then the scope of the mapping is the page. When combining multiple pages together for AFP print job 600, controller 402 may generate new Map structured fields and/or AEG structured fields for AFP output page 640 based on the corresponding structured fields in the pages that are to be combined. Only one AEG structured field is allowed per page, so when combining multiple pages AEGs across those pages must be combined into one, reconciling duplicate resource names, duplicate resource IDs, etc. MPOs, MPS', and MCF are all managed in this process. Duplicate names mapped to the same ID can be dropped, duplicate names mapped to different IDs are consolidated and callouts for those IDs across merged pages are updated (in IPO, IPS, and PTX structured fields), while distinct names and IDs are accumulated. One or all pages in a set may be missing MPOs, MPS', or MCF's, which are accounted for. If these structured fields are missing in the first page (e.g., page 601), then they are created in the right order as per the MO:DCA specification.

Further, the final vertical and horizontal page size for AFP output page 640 is set by controller 402 by modifying the Page Descriptor (PGD) structured field and/or the Presentation Text Descriptor (PTD)

In addition, if processing of AFP print job 600 ends without the appropriate layout and number of pages stitched together, then controller 402 may create and add an appropriate number of blank pages to the final AFP output page to complete the desired vertical and/or horizontal dimensions of the final AFP output page.

Although the previous discussion described vertically stitching two pages of an AFP print job together, any number of pages may be vertically and/or horizontally stitched together to achieve any size output page as desired. Further, pages AFP print job 600 may be processed in any order to achieve a desired layout, size, and/or arrangement of pages on a particular side of a printed medium as desired.

The embodiments described herein allow for a print shop operator to quickly and efficiently combine multiple pages of an AFP print job together to form any configuration of pages for printing, regardless of the initial page size limitations which may be present in the original AFP document. This allows the print shop operator to streamline the printing process and overcome form height limitations that may be present on some production printing equipment. Generally, this process is performed without interaction of the client that creates the AFP document, thereby eliminating the need to coordinate with clients regarding the particular size of pages that they generate for their AFP documents.

Figure 10:
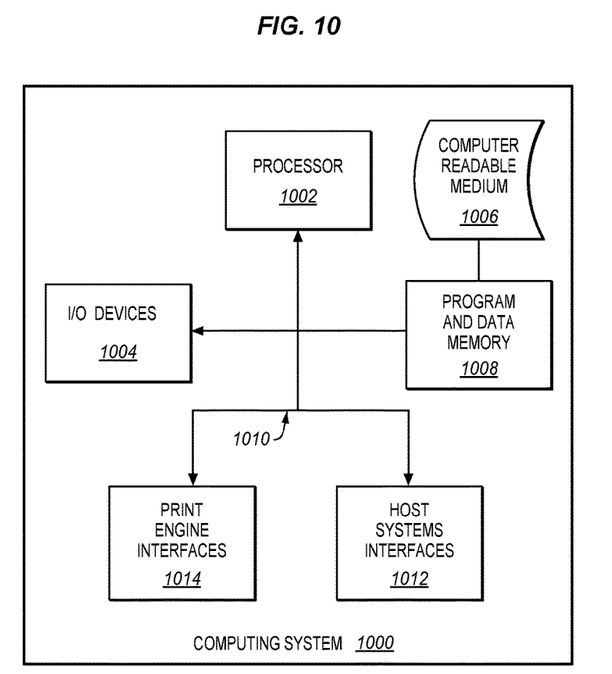
FIG. 10 is a block diagram illustrating a computer system operable to execute computer readable medium embodying programmed instructions to perform desired functions in an illustrative embodiment.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 10 illustrates a computing system 1000 in which a computer-readable medium 1006 may provide instructions for performing method 500 in an illustrative embodiment.

Furthermore, the invention can take the form of a computer program product accessible from a computer-usable or computer-readable medium 1006 providing program code for use by or in connection with a computer or any instruction execution system. For the purposes of this description, a computer-usable or computer-readable medium 1006 can be any apparatus that can contain, store, communicate, propagate, or transport the program for use by or in connection with the instruction execution system, apparatus, or device.

The computer-readable medium 1006 can be an electronic, magnetic, optical, electromagnetic, infrared, or semiconductor system (or apparatus or device) or a propagation medium. Examples of a computer-readable medium 1006 include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code includes at least one processor 1002 coupled directly or indirectly to memory 1008 through a system bus 1010. The memory 1008 can include local memory employed during actual execution of the program code, bulk storage, and cache memories which provide temporary storage of at least some program code in order to reduce the number of times code is retrieved from bulk storage during execution.

Input/output or I/O devices 1004 (including but not limited to keyboards, displays, pointing devices, etc.) can be coupled to the system either directly or through intervening I/O controllers.

Network adapters may also be coupled to the system to enable the data processing system to become coupled to other data processing systems, such a through host systems interfaces 1012, or remote printers or storage devices through intervening private or public networks, such as through print engine interfaces 1014. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

What is claimed is:

1. An apparatus comprising:
an interface configured to receive an Advanced Function Presentation (AFP) print job, wherein a logical page in the AFP print job begins with a first electronic marker indicative of a beginning of the logical page and ends with a second electronic marker indicative of an end of the logical page; and
a controller communicatively coupled to the interface that is configured to identify a first logical page and a second logical page in the AFP print job to combine together into an AFP logical output page, to determine an amount of offset for page contents of the second logical page, and to modify at least one structured field in the second logical page to shift the page contents of the second logical page by the amount of offset,
wherein the controller is configured to remove the first electronic marker from the first logical page, to remove the second electronic marker from the second logical page, to combine page contents of the first logical page and shifted page contents of the second logical page into the AFP logical output page, and to transmit the AFP logical output page to a printer for printing.

2. The apparatus of claim 1, wherein:
the first electronic marker comprises a Begin Page (BPG) structured field; and
the second electronic marker comprises an End Page (EPG) structured field.

3. The apparatus of claim 1, wherein:
the controller is configured to determine that the page contents of the second logical page comprise included objects, and to modify Include Page Overlay (IPO) structured fields and Include Page Segment (IPS) structured fields for the included objects in the second logical page to shift the included objects by the amount of offset.

4. The apparatus of claim 1, wherein:
the controller is configured to determine that the page contents of the second logical page comprise objects, and to modify Object Area Position (OBP) structured fields for the objects in the second logical page to shift the objects by the amount of offset.

5. The apparatus of claim 1, wherein:
the controller is configured to determine that the page contents of the second logical page comprise text, and to modify Absolute Move Inline (AMI) structured fields and Absolute Move Baseline (AMB) structured fields for the text in the second logical page to shift the text by the amount of offset.

6. The apparatus of claim 1, wherein:
the controller is configured to generate an Active Environment Group (AEG) structured field for the AFP logical output page based on an AEG structured field associated with at least one of the first logical page and the second logical page.

7. The apparatus of claim 1, wherein:
the controller is configured to generate a Mapped Page Overlay (MPO) structured field for the AFP logical output page based on a MPO structured field associated with at least one of the first logical page and the second logical page.

8. The apparatus of claim 1, wherein:
the controller is configured to generate a Mapped Page Segment (MPS) structured field for the AFP logical output page based on a MPS structured field associated with at least one of the first logical page and the second logical page.

9. The apparatus of claim 1, wherein:
the controller is configured to generate a Mapped Coded Font (MCF) structured field for the AFP logical output page based on a MCF structured field associated with at least one of the first logical page and the second logical page.

10. The apparatus of claim 1, wherein:
the controller is configured to determine a page size of the AFP logical output page based on page sizes of the first logical page and the second logical page, and to generate at least one of a Page Descriptor (PGD) structured field and a Presentation Text Descriptor (PTD) structured field for the AFP logical output page based on the page sizes.

11. A method, comprising:
receiving an Advanced Function Presentation (AFP) print job, wherein a logical page in the AFP print job begins with a first electronic marker indicative of a beginning of the logical page and ends with a second electronic marker indicative of an end of the logical page;
identifying a first logical page and a second logical page in the AFP print job to combine together into an AFP logical output page;
determining an amount of offset for page contents of the second logical page;
modifying at least one structured field in the second logical page to shift shifting the page contents of the second logical page by the amount of offset;
removing the first electronic marker from the first logical page;
removing the second electronic marker from the second logical page;
combining page contents of the first logical page and shifted page contents of the second logical page into the AFP logical output page; and
transmitting the AFP logical output page to a printer for printing.

12. The method of claim 11, wherein:
the first electronic marker comprises a Begin Page (BPG) structured field; and
the second electronic marker comprises an End Page (EPG) structured field.

13. The method of claim 11, wherein modifying the at least one structured field of the second logical page further comprises:

determining that the page contents of the second logical page comprise included objects; and
modifying Include Page Overlay (IPO) structured fields and Include Page Segment (IPS) structured fields for the included objects in the second logical page to shift the included objects by the amount of offset.

14. The method of claim 11, wherein modifying the at least one structured field of the second logical page further comprises:
determining that the page contents of the second logical page comprise objects; and
modifying Object Area Position (OBP) structured fields for the objects in the second logical page to shift the objects by the amount of offset.

15. The method of claim 11, wherein modifying the at least one structured field of the second logical page further comprises:
determining that the page contents of the second logical page comprise text; and
modifying Absolute Move Inline (AMI) structured fields and Absolute Move Baseline (AMB) structured fields for the text in the second logical page to shift the text by the amount of offset.

16. The method of claim 11, further comprising:
generating an Active Environment Group (AEG) structured field for the AFP logical output page based on an AEG structured field associated with at least one of the first logical page and the second logical page.

17. The method of claim 11, further comprising:
generating a Mapped Page Overlay (MPO) structured field for the AFP logical output page based on a MPO structured field associated with at least one of the first logical page and the second logical page.

18. The method of claim 11, further comprising:
generating a Mapped Page Segment (MPS) structured field for the AFP logical output page based on a MPS structured field associated with at least one of the first logical page and the second logical page.

19. The method of claim 11, further comprising:
generating a Mapped Coded Font (MCF) structured field for the AFP logical output page based on a MCF structured field associated with at least one of the first logical page and the second logical page.

20. The method of claim 11, further comprising:
determining a page size of the AFP logical output page based on page sizes of the first logical page and the second logical page; and
generating at least one of a Page Descriptor (PGD) structured field and a Presentation Text Descriptor (PTD) structured field for the AFP logical output page based on the page sizes.

21. A non-transitory computer-readable medium including programmed instructions which, when executed by a processor, direct the processor to:
receive an Advanced Function Presentation (AFP) print job, wherein a logical page in the AFP print job begins with a first electronic marker indicative of a beginning of the logical page and ends with a second electronic marker indicative of an end of the logical page;
identify a first logical page and a second logical page in the AFP print job to combine together into an AFP logical output page;
determine an amount of offset for page contents of the second logical page;
modify at least one structured field in the second logical page to shift the page contents of the second logical page by the amount of offset;
remove the first electronic marker from the first logical page;
remove the second electronic marker from the second logical page;
combine page contents of the first logical page and shifted page contents of the second logical page into the AFP logical output page; and
transmit the AFP logical output page to a printer for printing.

22. The non-transitory tangible computer-readable medium of claim 21, wherein:
the first electronic marker comprises a Begin Page (BPG) structured field; and
the second electronic marker comprises an End Page (EPG) structured field.

23. The non-transitory computer-readable medium of claim 21, wherein the programmed instructions further direct the processor to:
determine that the page contents of the second logical page comprise included objects; and
modify Include Page Overlay (IPO) structured fields and Include Page Segment (IPS) structured fields for the included objects in the second logical page to shift the included objects by the amount of offset.

24. The non-transitory computer-readable medium of claim 21, wherein the programmed instructions further direct the processor to:
determine that the page contents of the second logical page comprise objects; and
modify Object Area Position (OBP) structured fields for the objects in the second logical page to shift the objects by the amount of offset.

25. The non-transitory computer-readable medium of claim 21, wherein the programmed instructions further direct the processor to:
determine that the page contents of the second logical page comprise text; and
modify Absolute Move Inline (AMI) structured fields and Absolute Move Baseline (AMB) structured fields for the text in the second logical page to shift the text by the amount of offset.

26. The non-transitory computer-readable medium of claim 21, wherein the programmed instructions further direct the processor to:
generate an Active Environment Group (AEG) structured field for the AFP logical output page based on an AEG structured field associated with at least one of the first logical page and the second logical page.

27. The non-transitory computer-readable medium of claim 21, wherein the programmed instructions further direct the processor to:
generate a Mapped Page Overlay (MPO) structured field for the AFP logical output page based on a MPO structured field associated with at least one of the first logical page and the second logical page.

28. The non-transitory computer-readable medium of claim 21, wherein the programmed instructions further direct the processor to:
generate a Mapped Page Segment (MPS) structured field for the AFP logical output page based on a MPS structured field associated with at least one of the first logical page and the second logical page.

29. The non-transitory computer-readable medium of claim 21, wherein the programmed instructions further direct the processor to:
generate a Mapped Coded Font (MCF) structured field for the AFP logical output page based on a MCF structured field associated with at least one of the first logical page and the second logical page.

30. The non-transitory computer-readable medium of claim 21, wherein the programmed instructions further direct the processor to:
 determine a page size of the AFP logical output page based on page sizes of the first logical page and the second logical page; and
 generate at least one of a Page Descriptor (PGD) structured field and a Presentation Text Descriptor (PTD) structured field for the AFP logical output page based on the page sizes.

* * * * *